(12) United States Patent
Da et al.

(10) Patent No.: US 11,438,127 B2
(45) Date of Patent: Sep. 6, 2022

(54) MEASUREMENT GAP DETERMINATION METHOD, USER EQUIPMENT, AND NETWORK SIDE DEVICE

(71) Applicant: CHINA ACADEMY OF TELECOMMUNICATIONS TECHNOLOGY, Beijing (CN)

(72) Inventors: Ren Da, Beijing (CN); Zheng Zhao, Beijing (CN); Bin Ren, Beijing (CN); Tie Li, Beijing (CN); Fangchen Cheng, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 82 days.

(21) Appl. No.: 16/641,127

(22) PCT Filed: Jun. 1, 2018

(86) PCT No.: PCT/CN2018/089541
§ 371 (c)(1),
(2) Date: Feb. 21, 2020

(87) PCT Pub. No.: WO2019/037506
PCT Pub. Date: Feb. 28, 2019

(65) Prior Publication Data
US 2020/0204332 A1 Jun. 25, 2020

(30) Foreign Application Priority Data
Aug. 24, 2017 (CN) .................... 201710736917.1

(51) Int. Cl.
*H04L 5/00* (2006.01)
*H04L 27/26* (2006.01)
(Continued)

(52) U.S. Cl.
CPC .......... *H04L 5/0082* (2013.01); *H04L 5/0092* (2013.01); *H04L 27/2607* (2013.01); *H04W 24/10* (2013.01); *H04W 56/001* (2013.01)

(58) Field of Classification Search
CPC . H04L 5/0082; H04L 5/0092; H04L 27/2607; H04W 24/10; H04W 56/001
See application file for complete search history.

(56) References Cited

U.S. PATENT DOCUMENTS

2017/0048108 A1  2/2017  Yi et al.
2017/0048812 A1  2/2017  Da
(Continued)

FOREIGN PATENT DOCUMENTS

CN  104936256 A  9/2015
CN  106233765 A  12/2016
(Continued)

OTHER PUBLICATIONS

First Office Action and Search Report from CN app. no. 201710736917. 1, dated Dec. 19, 2019, with English translation provided by Global Dossier.
(Continued)

*Primary Examiner* — Jeffrey M Rutkowski
*Assistant Examiner* — Chae S Lee
(74) *Attorney, Agent, or Firm* — Ladas & Parry, LLP (57) ABSTRACT

A measurement gap determination method, a UE and a network side device are provided. The measurement gap determination method includes: receiving, by a UE, measurement configuration information of a SS block of at least one BWP transmitted from a network side device, wherein the UE operates at the BWP on which no SS block is transmitted when the UE receives the measurement configuration information; determining, by the UE, a measurement gap for the measurement of the SS block on the at least one
(Continued)

BWP in accordance with the measurement configuration information; and measuring, by the UE, the SS block on the at least one BWP in the measurement gap.

17 Claims, 4 Drawing Sheets

(51) Int. Cl.
  *H04W 24/10* (2009.01)
  *H04W 56/00* (2009.01)

(56) References Cited

U.S. PATENT DOCUMENTS

| | | | |
|---|---|---|---|
| 2017/0257785 | A1 | 9/2017 | Henttonen et al. |
| 2019/0200306 | A1* | 6/2019 | Ko .................. H04B 7/0617 |
| 2019/0387485 | A1* | 12/2019 | Ko .................. H04W 72/005 |
| 2020/0120622 | A1* | 4/2020 | Yoon ................ H04W 56/00 |
| 2020/0136878 | A1* | 4/2020 | Yi ................... H04W 24/10 |
| 2020/0374725 | A1* | 11/2020 | Chen ................ H04B 7/0626 |

FOREIGN PATENT DOCUMENTS

| | | |
|---|---|---|
| CN | 106664539 A | 5/2017 |
| WO | 2015018025 A1 | 2/2015 |
| WO | 2016200654 A1 | 12/2016 |

OTHER PUBLICATIONS

Extended European Search Report from EP app. no. 18848710.2, dated Aug. 10, 2020.
International Search Report from PCT/CN2018/089541, dated Aug. 22, 2018, with English translation from WIPO.
Written Opinion of the International Searching Authority from PCT/CN2018/089541, dated Aug. 22, 2018, with English translation from WIPO.
International Preliminary Report on Patentability from PCT/CN2018/089541, dated Feb. 25, 2020, with English translation provided by WIPO.
"SS block transmissions and RRM measurement in wideband CC", R1-1710374, 3GPP TSG RAN WG1 NR Ad-Hoc Meeting #2, Qingdao, P.R. China, Jun. 27-30, 2017.
"SS block transmissions in a wideband CC", R1-1710420, 3GPP TSG RAN WG1 NR Ad-Hoc Meeting #2, Qingdao, P.R. China, Jun. 27-30, 2017.
"Multiple SS block transmission in wideband CC", R1-1714406, 3GPP TSG RAN WG1 Meeting #90, Prague, P.R. Czechia, Aug. 21-25, 2017.
"Consideration on the measurement gap", R2-1708116, 3GPP TSG RAN WG2#NR_99, Berlin, Germany, Aug. 21-25, 2017.

* cited by examiner

MEASUREMENT GAP DETERMINATION METHOD, USER EQUIPMENT, AND NETWORK SIDE DEVICE

CROSS-REFERENCE TO RELATED APPLICATIONS

The present application is the U.S. national phase of PCT Application No. PCT/CN2018/089541 filed on Jun. 1, 2018, which claims priority to Chinese patent application No. 201710736917.1 filed on Aug. 24, 2017, the disclosures of which are incorporated herein by reference in their entireties.

TECHNICAL FIELD

The present disclosure relates to the field of communication technology, in particular to a measurement gap determination method, a User Equipment (UE), and a network side device.

BACKGROUND

In a communication system, usually a UE needs to perform measurement in a measurement gap. Merely two measurement gap modes are supported by a Long Term Evolution (LTE) system, and they have measurement gap periods of 40 ms and 80 ms respectively. However, a future communication system, e.g., a New Radio (NR) system, has a Synchronization Signal (SS) design different from the LTE system. When the measurement gap mode supported by the LTE system is still adopted by the NR system, there may exist too many measurement gaps.

SUMMARY

An object of the present disclosure is to provide a measurement gap determination mode, a UE and a network side device, so as to prevent the occurrence of too many measurement gaps.

In one aspect, the present disclosure provides in some embodiments a measurement gap determination method, including: receiving, by a UE, measurement configuration information transmitted from a network side device, wherein the measurement configuration information is measurement configuration information of a SS block actually transmitted on at least one Bandwidth Part (BWP), and the UE operates at the BWP on which no SS block is transmitted when the UE receives the measurement configuration information; determining, by the UE, a measurement gap for the measurement of the SS block on the at least one BWP in accordance with the measurement configuration information; and measuring, by the UE, the SS block on the at least one BWP in the measurement gap.

In a possible embodiment of the present disclosure, the measurement configuration information of the SS block actually transmitted on the at least one BWP includes: measurement configuration information of N SS blocks in M SS blocks actually transmitted on the at least one BWP, wherein the N SS blocks are first N SS blocks in the M SS blocks ranked in a descending order of detection probabilities, the detection probabilities are detection probabilities of the UE for the SS blocks, N is an integer greater than or equal to 1, and M is an integer greater than or equal to N.

In a possible embodiment of the present disclosure, the measurement configuration information includes at least one of: an index of each of the at least one BWP on which the SS block is actually transmitted, a frequency position of each of the at least one BWP on which the SS block is actually transmitted, and a transmission configuration of the SS block actually transmitted on each of the at least one BWP. The transmission configuration includes at least one of: an index of the actually-transmitted SS block in a SS block set, a time position of the actually-transmitted SS block in the SS block set, a transmission period of the SS block set, a time offset of the SS block set, a carrier spacing of the SS block, and a Cyclic Prefix (CP) of the SS block, wherein the SS block set is a SS block set to which each SS block actually transmitted on the at least one BWP belongs.

In a possible embodiment of the present disclosure, the measurement configuration information further includes at least one of an index table of the BWPs to be measured by the UE, a SS block set to be measured by the UE in each BWP in the index table, a period of a Radio Resource Management (RRM) measurement for each BWP in the index table, a start time of the RRM measurement for each BWP in the index table, and a stop time of the RRM measurement for each BWP in the index table, and a measurement report period.

In a possible embodiment of the present disclosure, the determining, by the UE, the measurement gap for the measurement of the SS block on the at least one BWP in accordance with the measurement configuration information includes: when the at least one BWP is one BWP, determining, by the UE, a measurement gap pattern for the measurement of the SS block on the BWP in accordance with the measurement configuration information, wherein the measurement gap pattern includes at least one local measurement gap of the BWP; or when the at least one BWP includes at least two BWPs, determining, by the UE, measurement gap patterns for the measurement of the SS block on the at least two BWPs in accordance with the measurement configuration information, wherein the measurement gap patterns include a measurement gap pattern of each of the at least two BWPs, and the measurement gap pattern of each BWP includes at least one local measurement gap of the BWP.

In a possible embodiment of the present disclosure, the local measurement gap is equal to a sum of a transmission time of T SS blocks and a tuning time at each of two sides of the T SS blocks, wherein T is an integer greater than or equal to 1, and when T is greater than 1, the T SS blocks are consecutive in a time domain.

In a possible embodiment of the present disclosure, no data service is provided by the network side device for the UE in the measurement gap.

In another aspect, the present disclosure provides in some embodiments a measurement gap determination method, including: generating, by a network side device, measurement configuration information of a SS block actually transmitted on at least one BWP; and transmitting, by the network side device, the measurement configuration information to a UE, wherein the UE operates at the BWP on which no SS block is transmitted when the network side device transmits the measurement configuration information to the UE.

In a possible embodiment of the present disclosure, the measurement gap configuration method further includes: estimating, by the network side device, M SS blocks actually transmitted on the at least one BWP; and selecting, by the network side device, first N SS blocks in the M SS blocks ranked in a descending order of detection probabilities, wherein the detection probabilities are detection probabilities of the UE for the SS blocks, N is an integer greater than or equal to 1, and M is an integer greater than or equal to N. The measurement configuration information of the SS block actually transmitted on the at least one BWP includes measurement configuration information of the N SS blocks.

In a possible embodiment of the present disclosure, the measurement configuration information includes at least one of: an index of each of the at least one BWP on which the SS block is actually transmitted, a frequency position of each of the at least one BWP on which the SS block is actually transmitted, and a transmission configuration of the SS block actually transmitted on each of the at least one BWP. The transmission configuration includes at least one of: an index of the actually-transmitted SS block in a SS block set, a time position of the actually-transmitted SS block in the SS block set, a transmission period of the SS block set, a time offset of the SS block set, a carrier spacing of the SS block, and a CP of the SS block, wherein the SS block set is a SS block set to which each SS block actually transmitted on the at least one BWP belongs.

In a possible embodiment of the present disclosure, the measurement configuration information further includes at least one of: an index table of the BWPs to be measured by the UE, a SS block set to be measured by the UE in each BWP in the index table, a period of a RRM measurement for each BWP in the index table, a start time of the RRM measurement for each BWP in the index table, and a stop time of the RRM measurement for each BWP in the index table, and a measurement report period.

In a possible embodiment of the present disclosure, the measurement gap determination method further includes determining, by the network side device, measurement gap for the measurement of the SS block on the at least one BWP by the UE in accordance with the measurement configuration information, wherein no data service is provided by the network side device for the UE in the measurement gap.

In a possible embodiment of the present disclosure, the determining, by the network side device, the measurement gap for the measurement of the SS block on the at least one BWP by the UE in accordance with the measurement configuration information includes: when the least one BWP is one BWP, determining, by the network side device, a measurement gap pattern for the measurement of the SS block on the BWP by the UE in accordance with the measurement configuration information, wherein the measurement gap pattern includes at least one local measurement gap of the BWP; or when the at least one BWP includes at least two BWPs, determining, by the network side device, measurement gap patterns for the measurement of the SS block on the at least two BWPs by the UE in accordance with the measurement configuration information, wherein the measurement gap patterns include a measurement gap pattern of each of the at least two BWPs, and the measurement gap pattern of each BWP includes at least one local measurement gap of the BWP.

In a possible embodiment of the present disclosure, the local measurement gap is equal to a sum of a transmission time of T SS blocks and a tuning time at each of two sides of the T SS blocks, wherein T is an integer greater than or equal to 1, and when T is greater than 1, the T SS blocks are consecutive in a time domain.

In yet another aspect, the present disclosure provides in some embodiments a UE, including: a reception module configured to receive measurement configuration information transmitted from a network side device, wherein the measurement configuration information is measurement configuration information of a SS block actually transmitted on at least one BWP, and the UE operates at the BWP on which no SS block is transmitted when the UE receives the measurement configuration information; a determination module configured to determine a measurement gap for the measurement of the SS block on the at least one BWP in accordance with the measurement configuration information; and a measurement module configured to measure the SS block on the at least one BWP in the measurement gap.

In a possible embodiment of the present disclosure, the measurement configuration information includes at least one of: an index of each of the at least one BWP on which the SS block is actually transmitted, a frequency position of each of the at least one BWP on which the SS block is actually transmitted, and a transmission configuration of the SS block transmitted on each of the at least one BWP. The transmission configuration includes at least one of: an index of the actually-transmitted SS block in a SS block set, a time position of the actually-transmitted SS block in the SS block set, a transmission period of the SS block set, a time offset of the SS block set, a carrier spacing of the SS block, and a CP of the SS block, wherein the SS block set is a SS block set to which each SS block actually transmitted on the at least one BWP belongs.

In a possible embodiment of the present disclosure, the determination module is further configured to: when the least one BWP is one BWP, determine a measurement gap pattern for the measurement of the SS block on the BWP in accordance with the measurement configuration information, wherein the measurement gap pattern includes at least one local measurement gap of the BWP; or when the at least one BWP includes at least two BWPs, determine measurement gap patterns for the measurement of the SS block on the at least two BWPs in accordance with the measurement configuration information, wherein the measurement gap patterns include a measurement gap pattern of each of the at least two BWPs, and the measurement gap pattern of each BWP includes at least one local measurement gap of the BWP.

In a possible embodiment of the present disclosure, the local measurement gap is equal to a sum of a transmission time of T SS blocks and a tuning time at each of two sides of the T SS blocks, wherein T is an integer greater than or equal to 1, and when T is greater than 1, the T SS blocks are consecutive in a time domain.

In still yet another aspect, the present disclosure further provides in some embodiments a network side device, including: a generation module configured to generate measurement configuration information of a SS block actually transmitted on at least one BWP; and a transmission module configured to transmit the measurement configuration information to a UE, wherein the UE operates at the BWP on which no SS block is transmitted when the network side device transmits the measurement configuration information to the UE.

In a possible embodiment of the present disclosure, the measurement configuration information includes at least one of: an index of each of the at least one BWP on which the SS block is actually transmitted, a frequency position of each of the at least one BWP on which the SS block is actually transmitted, and a transmission configuration of the SS block actually transmitted on each of the at least one BWP. The transmission configuration includes at least one of: an index of the actually-transmitted SS block in a SS block set, a time position of the actually-transmitted SS block in the SS block set, a transmission period of the SS block set, a time offset of the SS block set, a carrier spacing of the SS block, and a CP of the SS block, wherein the SS block set is a SS block set to which each SS block actually transmitted on the at least one BWP belongs.

In a possible embodiment of the present disclosure, the network side device further includes a determination module configured to determine measurement gap for the measurement of the SS block on the at least one BWP by the UE in accordance with the measurement configuration information, wherein no data service is provided by the network side device for the UE in the measurement gap.

In a possible embodiment of the present disclosure, the determination module is further configured to: when the least one BWP is one BWP, determine a measurement gap pattern for the measurement of the SS block on the BWP by the UE in accordance with the measurement configuration information, wherein the measurement gap pattern includes at least one local measurement gap of the BWP; or when the at least one BWP includes at least two BWPs, determine measurement gap patterns for the measurement of the SS block on the at least two BWPs by the UE in accordance with the measurement configuration information, wherein the measurement gap patterns include a measurement gap pattern of each of the at least two BWPs, and the measurement gap pattern of each BWP includes at least one local measurement gap of the BWP.

In a possible embodiment of the present disclosure, the local measurement gap is equal to a sum of a transmission time of T SS blocks and a tuning time at each of two sides of the T SS blocks, wherein T is an integer greater than or equal to 1, and when T is greater than 1, the T SS blocks are consecutive in a time domain.

In still yet another aspect, the present disclosure provides in some embodiments a UE, including a transceiver, a memory, a processor, and a computer program stored in the memory and configured to be executed by the processor, wherein the transceiver is configured to: receive measurement configuration information transmitted from a network side device, wherein the measurement configuration information is measurement configuration information of a SS block actually transmitted on at least one BWP, and the UE operates at the BWP on which no SS block is transmitted when the UE receives the measurement configuration information; determine a measurement gap for the measurement of the SS block on the at least one BWP in accordance with the measurement configuration information; and measure the SS block on the at least one BWP in the measurement gap. Alternatively, the transceiver is further configured to receive measurement configuration information transmitted from a network side device, wherein the measurement configuration information is measurement configuration information of a SS block actually transmitted on at least one BWP, and the UE operates at the BWP on which no SS block is transmitted when the UE receives the measurement configuration information; the processor is configured to read the computer program in the memory to determine measurement gap for the measurement of the SS block on the at least one BWP in accordance with the measurement configuration information; and the transceiver is further configured to measure the SS block on the at least one BWP in the measurement gap.

In a possible embodiment of the present disclosure, the measurement configuration information of the SS block actually transmitted on the at least one BWP includes: measurement configuration information of N SS blocks in M SS blocks actually transmitted on the at least one BWP, wherein the N SS blocks are first N SS blocks in the M SS blocks ranked in a descending order of detection probabilities, the detection probabilities are detection probabilities of the UE for the SS blocks, N is an integer greater than or equal to 1, and M is an integer greater than or equal to N.

In a possible embodiment of the present disclosure, the measurement configuration information includes at least one of: an index of each of the at least one BWP on which the SS block is actually transmitted, a frequency position of each of the at least one BWP on which the SS block is actually transmitted, and a transmission configuration of the SS block transmitted on each of the at least one BWP. The transmission configuration includes at least one of: an index of the actually-transmitted SS block in a SS block set, a time position of the actually-transmitted SS block in the SS block set, a transmission period of the SS block set, a time offset of the SS block set, a carrier spacing of the SS block, and a CP of the SS block, wherein the SS block set is a SS block set to which each SS block actually transmitted on the at least one BWP belongs.

In a possible embodiment of the present disclosure, the measurement configuration information further includes at least one of: an index table of the BWPs to be measured by the UE, a SS block set to be measured by the UE in each BWP in the index table, a period of a RRM measurement for each BWP in the index table, a start time of the RRM measurement for each BWP in the index table, and a stop time of the RRM measurement for each BWP in the index table, and a measurement report period.

In a possible embodiment of the present disclosure, the determining the measurement gap for the measurement of the SS block on the at least one BWP in accordance with the measurement configuration information includes: when the at least one BWP is one BWP, determining a measurement gap pattern for the measurement of the SS block on the BWP in accordance with the measurement configuration information, wherein the measurement gap pattern includes at least one local measurement gap of the BWP; or when the at least one BWP includes at least two BWPs, determining measurement gap patterns for the measurement of the SS block on the at least two BWPs in accordance with the measurement configuration information, wherein the measurement gap patterns include a measurement gap pattern of each of the at least two BWPs, and the measurement gap pattern of each BWP includes at least one local measurement gap of the BWP.

In a possible embodiment of the present disclosure, the local measurement gap is equal to a sum of a transmission time of T SS blocks and a tuning time at each of two sides of the T SS blocks, wherein T is an integer greater than or equal to 1, and when T is greater than 1, the T SS blocks are consecutive in a time domain.

In a possible embodiment of the present disclosure, no data service is provided by the network side device for the UE in the measurement gap.

In still yet another aspect, the present disclosure provides in some embodiments a transceiver, a memory, a processor, and a computer program stored in the memory and configured to be executed by the processor, wherein the processor is configured to read the computer program stored in the memory to generate measurement configuration information of a SS block actually transmitted on at least one BWP; and the transceiver is configured to transmit the measurement configuration information to a UE, wherein the UE operates at the BWP on which no SS block is transmitted when the network side device transmits the measurement configuration information to the UE.

In a possible embodiment of the present disclosure, the processor is further configured to read the computer program in the memory, so as to: estimate M SS blocks actually transmitted on the at least one BWP; and select first N SS blocks in the M SS blocks ranked in a descending order of detection probabilities, wherein the detection probabilities are detection probabilities of the UE for the SS blocks, N is an integer greater than or equal to 1, and M is an integer greater than or equal to N. The measurement configuration information of the SS block actually transmitted on the at least one BWP includes measurement configuration information of the N SS blocks.

In a possible embodiment of the present disclosure, the measurement configuration information includes at least one of: an index of each of the at least one BWP on which the SS block is actually transmitted, a frequency position of each of the at least one BWP on which the SS block is actually transmitted, and a transmission configuration of the SS block transmitted on each of the at least one BWP. The transmission configuration includes at least one of: an index of the actually-transmitted SS block in a SS block set, a time position of the actually-transmitted SS block in the SS block set, a transmission period of the SS block set, a time offset of the SS block set, a carrier spacing of the SS block, and a CP of the SS block, wherein the SS block set is a SS block set to which each SS block actually transmitted on the at least one BWP belongs.

In a possible embodiment of the present disclosure, the measurement configuration information further includes at least one of: an index table of the BWPs to be measured by the UE, a SS block set to be measured by the UE in each BWP in the index table, a period of a RRM measurement for each BWP in the index table, a start time of the RRM measurement for each BWP in the index table, and a stop time of the RRM measurement for each BWP in the index table, and a measurement report period.

In a possible embodiment of the present disclosure, the processor is further configured to read the computer program in the memory to determine measurement gap for the measurement of the SS block on the at least one BWP by the UE in accordance with the measurement configuration information; or the transceiver is further configured to determine measurement gap for the measurement of the SS block on the at least one BWP by the UE in accordance with the measurement configuration information. No data service is provided by the network side device for the UE in the measurement gap.

In a possible embodiment of the present disclosure, the determining the measurement gap for the measurement of the SS block on the at least one BWP by the UE in accordance with the measurement configuration information includes: when the least one BWP is one BWP, determining a measurement gap pattern for the measurement of the SS block on the BWP by the UE in accordance with the measurement configuration information, wherein the measurement gap pattern includes at least one local measurement gap of the BWP; or when the at least one BWP includes at least two BWPs, determining measurement gap patterns for the measurement of the SS block on the at least two BWPs by the UE in accordance with the measurement configuration information, wherein the measurement gap patterns include a measurement gap pattern of each of the at least two BWPs, and the measurement gap pattern of each BWP includes at least one local measurement gap of the BWP.

In a possible embodiment of the present disclosure, the local measurement gap is equal to a sum of a transmission time of T SS blocks and a tuning time at each of two sides of the T SS blocks, wherein T is an integer greater than or equal to 1, and when T is greater than 1, the T SS blocks are consecutive in a time domain In still yet another aspect, the present disclosure provides in some embodiments a computer-readable storage medium storing therein a computer program. The computer program is configured to be executed by a processor to implement the above-mentioned measurement gap determination method for the UE.

In still yet another aspect, the present disclosure provides in some embodiments a computer-readable storage medium storing therein a computer program. The computer program is configured to be executed by a processor to implement the above-mentioned measurement gap determination method for the network side device.

According to the embodiments of the present disclosure, the UE may receive the measurement configuration information transmitted from the network side device, the measurement configuration information may be measurement configuration information of the one or more SS blocks actually transmitted on the at least one BWP, and the UE may operate at a BWP on which no SS block is transmitted during the reception of the measurement configuration information. Next, the UE may determine the one or more measurement gaps for the measurement of the one or more SS blocks on the at least one BWP in accordance with the measurement configuration information. Then, the UE may measure the one or more SS blocks on the at least one BWP in the one or more measurement gaps. The one or more measurement gaps may be determined merely in accordance with the measurement configuration information of the one or more SS blocks on the at least one BWP, as compared with the related art where periodical measurement gaps are provided, it is able to reduce the quantity of the measurement gaps.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
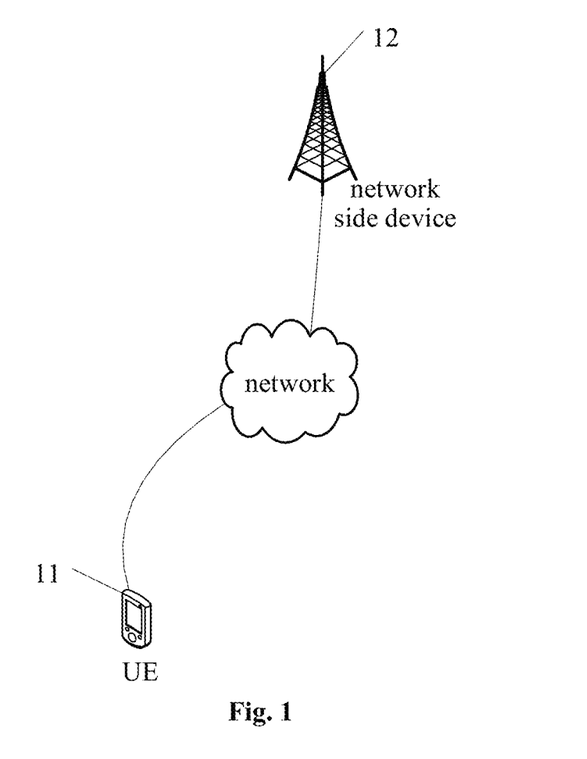
FIG. 1 is a schematic view showing an available network according to an embodiment of the present disclosure.

FIG. 1 shows a network to which the scheme in the embodiments of the present disclosure is applicable. As shown in FIG. 1, the network includes a UE 11 and a network side device 12. The UE 11 may be a terminal device such as a mobile phone, a tablet personal computer, a laptop computer, a Personal Digital Assistant (PDA), a Mobile Internet Device (MID) or a wearable device. It should be appreciated that, the types of the UE 11 will not be particularly defined herein. The network side device 12 may be a base station, e.g., a micro base station, a Long Term Evolution (LTE) evolved Node B (eNB), or $5^{th}$-Generation (5G) New Radio (NR) NB, or a small base station (e.g., a Low Power Node (LPN) pico base station, or a femto base station), or an Access Point (AP). In addition, the base station may also be a network node consisting of a Central Unit (CU) and a plurality of Transmission Reception Points (TRPs) managed and controlled by the CU. It should be appreciated that, the types of the base station will not be particularly defined herein.

Figure 2:
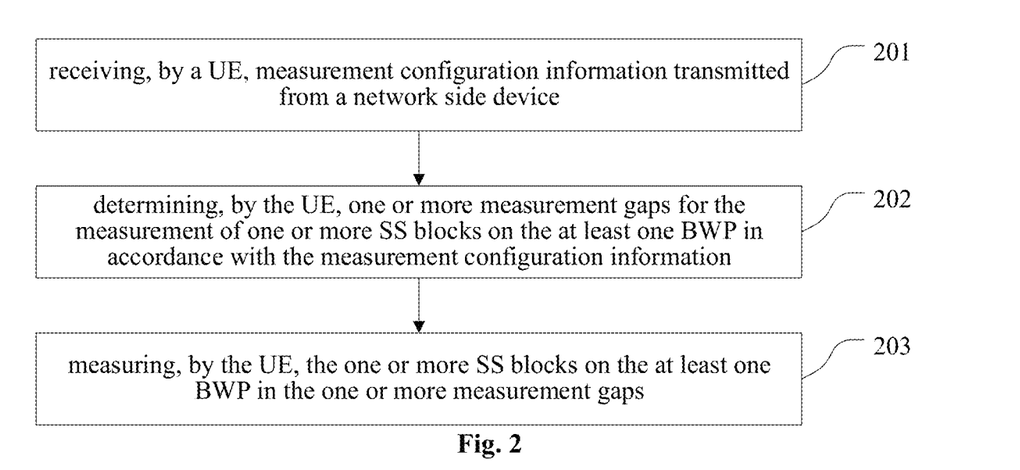
FIG. 2 is a flow chart of a measurement gap determination method according to an embodiment of the present disclosure.

As shown in FIG. 2, the present disclosure provides in some embodiments a measurement gap determination method which includes: Step 201 of receiving, by a UE, measurement configuration information transmitted from a network side device, the measurement configuration information being measurement configuration information of one or more SS blocks actually transmitted on at least one BWP, the UE operating at a BWP on which no SS block is transmitted during the reception of the measurement configuration information; Step 202 of determining, by the UE, one or more measurement gaps for the measurement of the one or more SS blocks on the at least one BWP in accordance with the measurement configuration information; and Step 203 of measuring, by the UE, the one or more SS blocks on the at least one BWP in the one or more measurement gaps.

The at least one BWP may include other BWPs in a same component carrier as a BWP at which the UE operates.

The measurement configuration information may be an index, a frequency position or a time-domain position of each SS block, which will not be particularly defined herein.

In the embodiments of the present disclosure, the UE May determine a transmission position of each SS block in accordance with the measurement configuration information of the SS block, and then determine the one or more measurement gaps for the SS block. It should be appreciated that, the actually-transmitted SS block may be understood as an SS block actually transmitted on the BWP. In the embodiments of the present disclosure, a transmission timing of the one or more SS blocks will not be particularly defined, e.g., the one or more SS blocks may be transmitted after Step 202.

In addition, in the embodiments of the present disclosure, the UE may be a narrow-band UE, and the narrow-band UE may be a UE operating at one or more BWPs.

When receiving the measurement configuration information, the UE may operate at the BWP on which no SS block is transmitted, and receive the measurement configuration information of the BWP on which the SS block is actually transmitted from the network side device. In the embodiments of the present disclosure, the network side device may configure a plurality of BWPs for each carrier in a semi-static manner, and each BWP may be configured to transmit or not transmit the SS block. The narrow-band UE may be configured to operate at a serving BWP on which no SS block is transmitted.

The determining the one or more measurement gaps for the measurement of the one or more SS blocks on the at least one BWP in accordance with the measurement configuration information may include determining, by the UE, a transmission position of each SS block actually transmitted on the at least one BWP in accordance with the measurement configuration information, and determining the one or more measurement gaps for the measurement of the actually-transmitted SS blocks.

Through the above steps, the UE may determine the one or more measurement gaps for the measurement of the one or more SS blocks on the at least one BWP in accordance with the measurement configuration information of the one or more SS blocks. As a result, it is able to set the measurement gaps merely at time-domain positions where the SS blocks are actually transmitted and not set the measurement gaps at time-domain positions where no SS block is actually transmitted, i.e., to reduce the quantity of the measurement gaps, thereby to prevent the service for the UE from being interrupted as possible, and improve the communication performance of the UE.

In a possible embodiment of the present disclosure, the measurement configuration information of the one or more SS blocks actually transmitted on the at least one BWP may include measurement configuration information of N SS blocks in M SS blocks actually transmitted on the at least one BWP, the N SS blocks may be first N SS blocks in the M SS blocks ranked in a descending order of detection probabilities, the detection probabilities may be detection probabilities of the UE for the SS blocks, N is an integer greater than or equal to 1, and M is an integer greater than or equal to N.

The M SS blocks may be SS blocks possibly detected by the UE, e.g., beam directions for the transmission of the M SS blocks may cover a position of the UE.

In the embodiments of the present disclosure, the network side device may estimate the SS blocks possibly detected by the UE in accordance with the beam directions for providing data services for the UE and the beam directions configured on the other BWPs for actually transmitting the SS blocks. For example, the network side device may determine the position of the UE in accordance with the beam directions for providing the data services for the UE, determine a correspondence between the beam directions configured on the other BWPs for the actually transmitting the SS blocks and the position of the UE, so as to determine the corresponding SS blocks possibly detected by the UE. Then, the network side device may select the first N SS blocks from the SS blocks possibly detected by the UE and ranked in a descending order of the detection probabilities. The first N SS blocks may be SS blocks most possibly detected by the UE and selected by the network side device in accordance with the beam directions for actually transmitting the SS blocks and the position of the UE.

In the embodiments of the present disclosure, merely the measurement configuration information of the N SS blocks may be transmitted to the UE, so it is able to further reduce the quantity of the measurement gaps for the UE.

In a possible embodiment of the present disclosure, the measurement configuration information may include at least one of an index of each of the at least one BWP on which the SS block is actually transmitted, a frequency position of each of the at least one BWP on which the SS block is actually transmitted, and a transmission configuration of each SS block actually transmitted on each of the at least one BWP. The transmission configuration may include at least one of an index of each actually-transmitted SS block in a SS block set, a time-domain position of each actually-transmitted SS block in the SS block set, a transmission period of the SS block set, a time offset of the SS block set, a carrier spacing of each SS block, and a CP of each SS block. The SS block set may be a SS block set to which each SS block actually transmitted on the at least one BWP belongs.

The index of each of the at least one BWP may be an index of each BWP in a component carrier where the BWP at which the UE operates and on which no SS block is transmitted is located, and the frequency position may also be a frequency position in the component carrier.

The SS block set may also be called as an SS burst set.

It should be appreciated that, in the embodiments of the present disclosure, when the measurement configuration information merely includes the indices, the UE May determine the frequency position and the transmission configuration in accordance with a pre-acquired correspondence among the indices, the frequency positions and the transmission configurations. In addition, when the measurement configuration information merely includes the frequency position, the UE may determine the index and the transmission configuration in accordance with the pre-acquired correspondence. When the measurement configuration information merely includes the transmission configuration, the UE may determine the index and the frequency position in accordance with the pre-acquired correspondence. Identically, the transmission configuration may also merely include at least one of the index or the time position of each actually-transmitted SS block in the SS block set, the transmission period of the SS block set, the time offset of each SS block set, the carrier spacing of each SS block, and the CP of each SS block, which will not be particularly defined herein.

In addition, the measurement configuration information may be notified by the network side device to the UE through broadcasting system information or through UE-specific Radio Resource Control (RRC) signaling, e.g., through Remaining Minimum System Information (RMSI) or Other System Information (OSI).

In the embodiments of the present disclosure, the UE may accurately determine the at least one BWP and the transmission configuration of each SS block actually transmitted on the at least one BWP in accordance with the measurement configuration information, and then accurately determine the one or more measurement gaps for the measurement of each actually-transmitted SS block, so as to further reduce the quantity of the measurement gaps for the UE.

In a possible embodiment of the present disclosure, the measurement configuration information may further include at least one of an index table of the BWPs to be measured by the UE, a SS block set to be measured by the UE in each BWP in the index table, an RRM measurement period of each BWP in the index table, a start time of the RRM measurement for each BWP in the index table, and a stop time of the RRM measurement for each BWP in the index table, and a measurement report period.

In the embodiments of the present disclosure, through the additional measurement configuration information, it is able to facilitate the UE to further reduce the quantity of the measurement gaps. This is because, the UE may determine the measurement gaps in which the SS blocks needs to be actually transmitted by the network side device in a more accurate manner in accordance with the additional measurement configuration information.

In a possible embodiment of the present disclosure, the determining, by the UE, the one or more measurement gaps for the measurement of the one or more SS blocks on the at least one BWP in accordance with the measurement configuration information may include: when the at least one BWP includes one BWP, determining, by the UE, a measurement gap pattern for the measurement of the one or more SS blocks on the BWP in accordance with the measurement configuration information, the measurement gap pattern including at least one local measurement gap of the BWP; or when the at least one BWP includes at least two BWPs, determining, by the UE, measurement gap patterns for the measurement of the one or more SS blocks on the at least two BWPs in accordance with the measurement configuration information, the measurement gap patterns including a measurement gap pattern of each of the at least two BWPs, and the measurement gap pattern of each BWP including at least one local measurement gap of the BWP.

When the at least one BWP includes one BWP, it may be understood as that the UE is configured to measure the SS blocks on merely one BWP, and when the at least one BWP includes at least two BWPs, it may be understood as that the UE is configured to measure the SS blocks on a plurality of BWPs.

When the measurement gap pattern includes at least one local measurement gap of the BWP, the measurement gap pattern may consist of at least one local measurement gap of the BWP. The measurement gap pattern of each BWP may include a measurement gap pattern for the measurement of the SS block on the BWP.

In addition, the measurement gap pattern may be determined within the transmission period of the SS block, and the network side device may actually transmit one or more SS blocks within one local measurement gap. For example, the local measurement gap may be equal to a sum of a transmission time of T SS blocks and a tuning time at each of two sides of the T SS blocks, where T is an integer greater than or equal to 1, and when T is greater than 1, the T SS blocks may be consecutive in a time domain.

The tuning time may be a Radio Frequency (RF) tuning time, e.g., the RF tuning time may be set as X (X is greater than or equal to 1) Orthogonal Frequency Division Multiplexing (OFDM)) symbols. The transmission time of the SS block may be 4 or 5 symbols, which will not be particularly defined herein. As sown in FIG. 3, taking one BWP as an example, within the transmission period of the SS block set (here, the transmission period of the SS block set may also be called as the transmission period of the SS block, because they are identical), there are eight candidate transmission positions for the SS blocks, i.e., one SS block set includes eight candidate transmission positions for the SS blocks, and there are merely five actually-transmitted SS blocks. Hence, the measurement gap pattern on the BWP may include a local measurement gap 1 and a local measurement gap 2.

Figure 3:
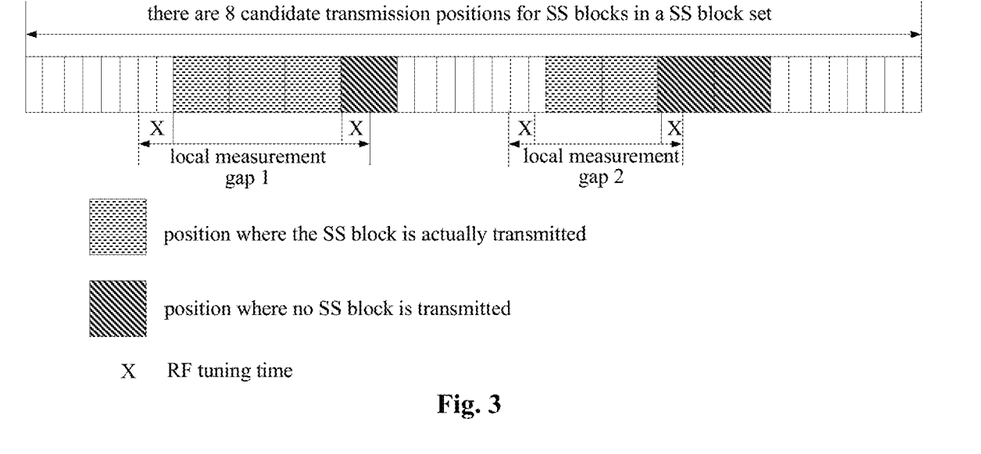
FIG. 3 is a schematic view showing measurement gaps according to an embodiment of the present disclosure.

In the embodiments of the present disclosure, the local measurement gaps and the corresponding measurement gap patterns may be determined accurately, so it is able to further reduce the quantity of the measurement gaps.

In a possible embodiment of the present disclosure, no data service may be provided by the network side device for the UE in the one or more measurement gaps.

In this regard, the measurement of the SS blocks may not be adversely affected by the data service, so as to improve the measurement performance.

According to the embodiments of the present disclosure, the UE may receive the measurement configuration information transmitted from the network side device, the measurement configuration information may be measurement configuration information of the one or more SS blocks actually transmitted on the at least one BWP, and the UE may operate at a BWP on which no SS block is transmitted during the reception of the measurement configuration information. Next, the UE may determine the one or more measurement gaps for the measurement of the one or more SS blocks on the at least one BWP in accordance with the measurement configuration information. Then, the UE may measure the one or more SS blocks on the at least one BWP in the one or more measurement gaps. The one or more measurement gaps may be determined merely in accordance with the measurement configuration information of the one or more SS blocks on the at least one BWP, as compared with the related art where periodical measurement gaps are provided, it is able to reduce the quantity of the measurement gaps.

Figure 4:
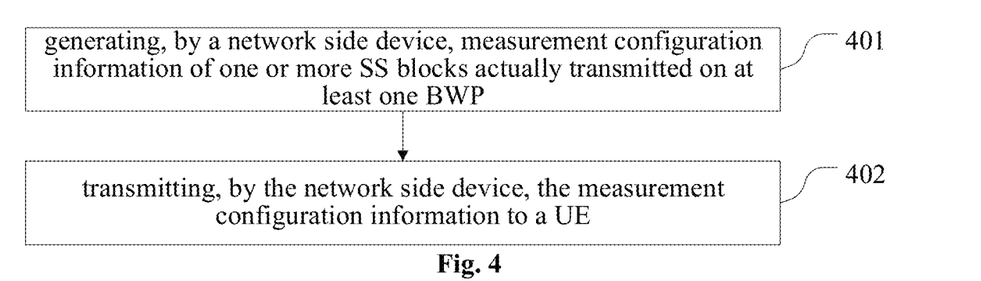
FIG. 4 is a flow chart of another measurement gap determination method according to an embodiment of the present disclosure.

As shown in FIG. 4, the present disclosure further provides in some embodiments a measurement gap determination method which includes: Step 401 of generating, by a network side device, measurement configuration information of one or more SS blocks actually transmitted on at least one BWP; and Step 402 of transmitting, by the network side device, the measurement configuration information to a UE. The UE operates at a BWP on which no SS block is transmitted when the measurement configuration information is transmitted by the network side device to the UE.

In a possible embodiment of the present disclosure, the measurement gap determination method may further include: estimating, by the network side device, M SS blocks actually transmitted on the at least one BWP; and selecting, by the network side device, first N SS blocks in the M SS blocks ranked in a descending order of detection probabilities, the detection probabilities being detection probabilities of the UE for the SS blocks, where N is an integer greater than or equal to 1, and M is an integer greater than or equal to N. The measurement configuration information of the one or more SS blocks actually transmitted on the at least one BWP may include measurement configuration information of the N SS blocks.

In a possible embodiment of the present disclosure, the measurement configuration information may include at least one of an index of each of the at least one BWP on which the SS block is actually transmitted, a frequency position of each of the at least one BWP on which the SS block is actually transmitted, and a transmission configuration of each SS block actually-transmitted on each of the at least one BWP. The transmission configuration may include at least one of an index of each actually-transmitted SS block in a SS block set, a time-domain position of each actually-transmitted SS block in the SS block set, a transmission period of the SS block set, a time offset of the SS block set, a carrier spacing of each SS block, and a CP of each SS block. The SS block set may be a SS block set to which each SS block actually transmitted on the at least one BWP belongs.

In a possible embodiment of the present disclosure, the measurement configuration information may further include at least one of an index table of the BWPs to be measured by the UE, a SS block set to be measured by the UE in each BWP in the index table, an RRM measurement period of each BWP in the index table, a start time of the RRM measurement for each BWP in the index table, and a stop time of the RRM measurement for each BWP in the index table, and a measurement report period.

In a possible embodiment of the present disclosure, the measurement gap determination method may further include determining, by the network side device, one or more measurement gaps for the measurement of the one or more SS blocks on the at least one BWP by the UE in accordance with the measurement configuration information. No data service may be provided by the network side device for the UE in the one or more measurement gaps.

In a possible embodiment of the present disclosure, the determining, by the network side device, the one or more measurement gaps for the measurement of the one or more SS blocks on the at least one BWP by the UE in accordance with the measurement configuration information may include: when the least one BWP includes one BWP, determining, by the network side device, a measurement gap pattern for the measurement of the one or more SS blocks on the BWP by the UE in accordance with the measurement configuration information, the measurement gap pattern including at least one local measurement gap of the BWP; or when the at least one BWP is at least two BWPs, determining, by the network side device, measurement gap patterns for the measurement of the one or more SS blocks on the at least two BWPs by the UE in accordance with the measurement configuration information, the measurement gap patterns including a measurement gap pattern of each of the at least two BWPs, and the measurement gap pattern of each BWP including at least one local measurement gap of the BWP.

In a possible embodiment of the present disclosure, the local measurement gap may be equal to a sum of a transmission time of T SS blocks and a tuning time at each of two sides of the T SS blocks, where T is an integer greater than or equal to 1, and when T is greater than 1, the T SS blocks are consecutive in a time domain.

It should be appreciated that, as a method for the network side device corresponding to the measurement gap determination method for the UE in FIG. 2, the implementation of the measurement gap determination method for the network side device may refer to the relevant description about FIG. 2 with a same beneficial effect, which will not be particularly defined herein.

Figure 5:
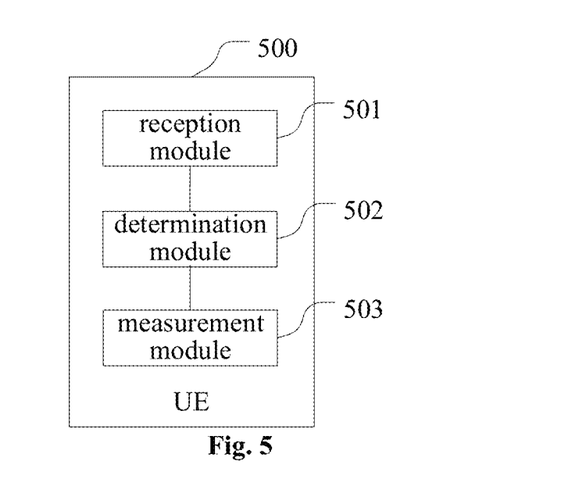
FIG. 5 is a schematic view showing a UE according to an embodiment of the present disclosure.

As shown in FIG. 5, the present disclosure further provides in some embodiments a UE 500 which includes: a reception module 501 configured to receive measurement configuration information transmitted from a network side device, the measurement configuration information being measurement configuration information of one or more SS blocks actually transmitted on at least one BWP, the UE operating at a BWP on which no SS block is transmitted during the reception of the measurement configuration information; a determination module 502 configured to determine one or more measurement gaps for the measurement of the one or more SS blocks on the at least one BWP in accordance with the measurement configuration information; and a measurement module 503 configured to measure the one or more SS blocks on the at least one BWP in the one or more measurement gaps.

In a possible embodiment of the present disclosure, the measurement configuration information of the one or more SS blocks actually transmitted on the at least one BWP may include measurement configuration information of N SS blocks in M SS blocks actually transmitted on the at least one BWP, the N SS blocks may be first N SS blocks in the M SS blocks ranked in a descending order of detection probabilities, the detection probabilities may be detection probabilities of the UE for the SS blocks, N is an integer greater than or equal to 1, and M is an integer greater than or equal to N.

In a possible embodiment of the present disclosure, the measurement configuration information may include at least one of an index of each of the at least one BWP on which the SS block is actually transmitted, a frequency position of each of the at least one BWP on which the SS block is actually transmitted, and a transmission configuration of each SS block actually transmitted on each of the at least one BWP. The transmission configuration may include at least one of an index of each actually-transmitted SS block in a SS block set, a time position of each actually-transmitted SS block in the SS block set, a transmission period of the SS block set, a time offset of the SS block set, a carrier spacing of each SS block, and a CP of each SS block. The SS block set may be a SS block set to which each SS block actually transmitted on the at least one BWP belongs.

In a possible embodiment of the present disclosure, the measurement configuration information may further include at least one of an index table of the BWPs to be measured by the UE, a SS block set to be measured by the UE in each BWP in the index table, an RRM measurement period of each BWP in the index table, a start time of the RRM measurement for each BWP in the index table, and a stop time of the RRM measurement for each BWP in the index table, and a measurement report period.

In a possible embodiment of the present disclosure, the determination module 502 is further configured to: when the at least one BWP includes one BWP, determine a measurement gap pattern for the measurement of the one or more SS blocks on the BWP in accordance with the measurement configuration information, the measurement gap pattern including at least one local measurement gap of the BWP; or when the at least one BWP includes at least two BWPs, determine measurement gap patterns for the measurement of the one or more SS blocks on the at least two BWPs in accordance with the measurement configuration information, the measurement gap patterns including a measurement gap pattern of each of the at least two BWPs, and the measurement gap pattern of each BWP including at least one local measurement gap of the BWP.

In a possible embodiment of the present disclosure, the local measurement gap may be equal to a sum of a transmission time of T SS blocks and a tuning time at each of two sides of the T SS blocks, where T is an integer greater than or equal to 1, and when T is greater than 1, the T SS blocks are consecutive in a time domain.

In a possible embodiment of the present disclosure, no data service may be provided by the network side device for the UE in the one or more measurement gaps.

It should be appreciated that, the UE 500 may be a UE for the above-mentioned measurement gap determination method, and the implementation of the UE may refer to that of the above-mentioned measurement gap determination method with a same beneficial effect, which will not be particularly defined herein.

Figure 6:
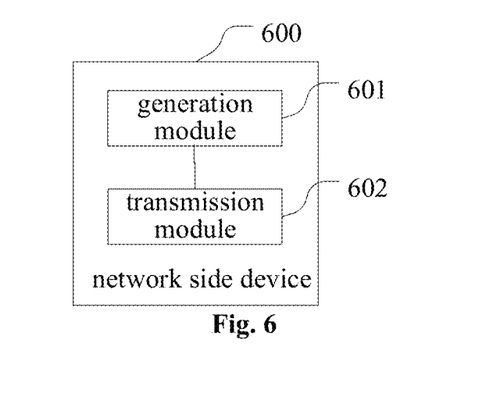
FIG. 6 is a schematic view showing another network side device according to an embodiment of the present disclosure.

As shown in FIG. 6, the present disclosure further provides in some embodiments a network side device 600 which includes: a generation module 601 configured to generate measurement configuration information of one or more SS blocks actually transmitted on at least one BWP; and a transmission module 602 configured to transmit the measurement configuration information to a UE. The UE may operate at a BWP on which no SS block is transmitted when the measurement configuration information is transmitted by the network side device to the UE.

Figure 7:
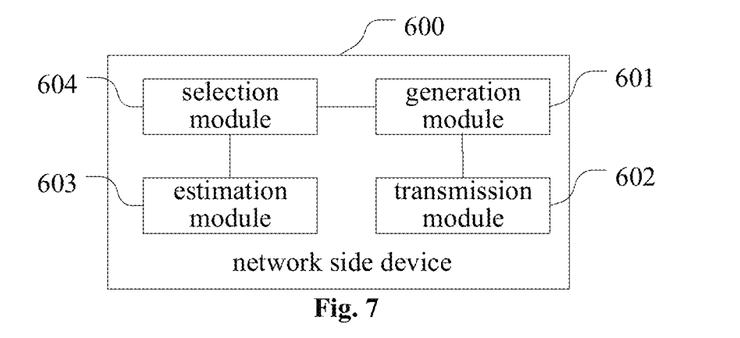
FIG. 7 is a schematic view showing yet another network side device according to an embodiment of the present disclosure.

In a possible embodiment of the present disclosure, as shown in FIG. 7, the network side device 600 may further include: an estimation module 603 configured to estimate M SS blocks actually transmitted on the at least one BWP; and a selection module 604 configured to select first N SS blocks in the M SS blocks ranked in a descending order of detection probabilities, the detection probabilities being detection probabilities of the UE for the SS blocks, where N is an integer greater than or equal to 1, and M is an integer greater than or equal to N. The measurement configuration information of the one or more SS blocks actually transmitted on the at least one BWP may include measurement configuration information of the N SS blocks.

In a possible embodiment of the present disclosure, the measurement configuration information may include at least one of an index of each of the at least one BWP on which the SS block is actually transmitted, a frequency position of each of the at least one BWP on which the SS block is actually transmitted, and a transmission configuration of each SS block transmitted on each of the at least one BWP. The transmission configuration may include at least one of an index of each actually-transmitted SS block in a SS block set, a time-domain position of each actually-transmitted SS block in the SS block set, a transmission period of the SS block set, a time offset of the SS block set, a carrier spacing of each SS block, and a CP of each SS block. The SS block set may be a SS block set to which each SS block actually transmitted on the at least one BWP belongs.

In a possible embodiment of the present disclosure, the measurement configuration information may further include at least one of an index table of the BWPs to be measured by the UE, a SS block set to be measured by the UE in each BWP in the index table, an RRM measurement period of each BWP in the index table, a start time of the RRM measurement for each BWP in the index table, and a stop time of the RRM measurement for each BWP in the index table, and a measurement report period.

Figure 8:
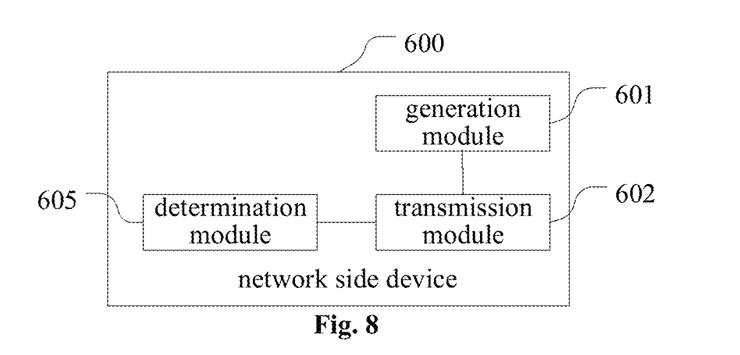
FIG. 8 is a schematic view showing still yet another network side device according to an embodiment of the present disclosure.

In a possible embodiment of the present disclosure, as shown in FIG. 8, the network side device 600 may further include a determination module 605 configured to determine one or more measurement gaps for the measurement of the one or more SS blocks on the at least one BWP by the UE in accordance with the measurement configuration information. No data service may be provided by the network side device for the UE in the one or more measurement gaps.

In a possible embodiment of the present disclosure, the determination module 605 is further configured to: when the least one BWP includes one BWP, determine a measurement gap pattern for the measurement of the one or more SS blocks on the BWP by the UE in accordance with the measurement configuration information, the measurement gap pattern including at least one local measurement gap of the BWP; or when the at least one BWP includes at least two BWPs, determine measurement gap patterns for the measurement of the one or more SS blocks on the at least two BWPs by the UE in accordance with the measurement configuration information, the measurement gap patterns including a measurement gap pattern of each of the at least two BWPs, and the measurement gap pattern of each BWP including at least one local measurement gap of the BWP.

In a possible embodiment of the present disclosure, the local measurement gap may be equal to a sum of a transmission time of T SS blocks and a tuning time at each of two sides of the T SS blocks, where T is an integer greater than or equal to 1, and when T is greater than 1, the T SS blocks may be consecutive in a time domain.

It should be appreciated that, in this embodiment, the network side device 600 may be a network side device for the above-mentioned measurement gap determination method, and the implementation of the network side device may refer to that of the above-mentioned measurement gap determination method with a same beneficial effect, which will not be particularly defined herein.

Figure 9:
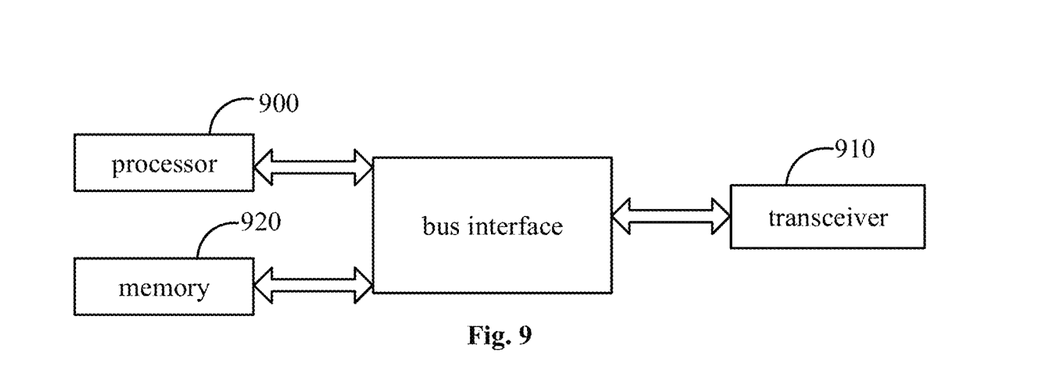
FIG. 9 is a schematic view showing another UE according to an embodiment of the present disclosure.

As shown in FIG. 9, the present disclosure further provides in some embodiments a UE which includes a transceiver 910, a memory 920, a processor 900, and a computer program stored in the memory 920 and executed by the processor.

The transceiver 910 is configured to: receive measurement configuration information transmitted from a network side device, the measurement configuration information being measurement configuration information of one or more SS blocks actually transmitted on at least one BWP, the UE operating at a BWP on which no SS block is transmitted during the reception of the measurement configuration information; determine one or more measurement gaps for the measurement of the one or more SS blocks on the at least one BWP in accordance with the measurement configuration information; and measure the one or more SS blocks on the at least one BWP in the one or more measurement gaps; or the transceiver 910 is further configured to receive measurement configuration information transmitted from a network side device, the measurement configuration information being measurement configuration information of one or more SS blocks actually transmitted on at least one BWP, the UE operating at a BWP on which no SS block is transmitted during the reception of the measurement configuration information; the processor 900 is configured to read the computer program in the memory 920, so as to determine one or more measurement gaps for the measurement of the one or more SS blocks on the at least one BWP in accordance with the measurement configuration information; and the transceiver 910 is further configured to measure the one or more SS blocks on the at least one BWP in the one or more measurement gaps. It can be seen from above that the determination of one or more measurement gaps for the measurement of the one or more SS blocks on the at least one BWP may be implemented by either the transceiver 910 or the processor 900.

In FIG. 9, bus architecture may include a number of buses and bridges connected to each other, so as to connect various circuits for one or more processors such as the processor 900 and one or more memories such as the memory 920. In addition, as is known in the art, the bus architecture may be used to connect any other circuits, such as a circuit for a peripheral device, a circuit for a voltage stabilizer and a power management circuit, which are not particularly defined herein. A bus interface may be provided, and the transceiver 910 may include a plurality of elements, e.g., a transmitter and a receiver for communication with any other devices over a transmission medium. The processor 900 may take charge of managing the bus architecture as well general processings. The memory 920 may store data therein for the operation of the processor 900.

It should be appreciated that, the memory 920 may not be limited to a device merely located on the UE, and the memory 920 and the processor 900 may be located at different geographical positions.

In a possible embodiment of the present disclosure, the measurement configuration information of the one or more SS blocks actually transmitted on the at least one BWP may include measurement configuration information of N SS blocks in M SS blocks actually transmitted on the at least one BWP, the N SS blocks may be first N SS blocks in the M SS blocks ranked in a descending order of detection probabilities, the detection probabilities may be detection probabilities of the UE for the SS blocks, N is an integer greater than or equal to 1, and M is an integer greater than or equal to N.

In a possible embodiment of the present disclosure, the measurement configuration information may include at least one of an index of each of the at least one BWP on which the SS block is actually transmitted, a frequency position of each of the at least one BWP on which the SS block is actually transmitted, and a transmission configuration of each SS block actually transmitted on each of the at least one BWP. The transmission configuration may include at least one of an index of each actually-transmitted SS block in a SS block set, a time position of each actually-transmitted SS block in the SS block set, a transmission period of the SS block set, a time offset of the SS block set, a carrier spacing of each SS block, and a CP of each SS block. The SS block set may be a SS block set to which each SS block actually transmitted on the at least one BWP belongs.

In a possible embodiment of the present disclosure, the measurement configuration information may further include at least one of an index table of the BWPs to be measured by the UE, a SS block set to be measured by the UE in each BWP in the index table, an RRM measurement period of each BWP in the index table, a start time of the RRM measurement for each BWP in the index table, and a stop time of the RRM measurement for each BWP in the index table, and a measurement report period.

In a possible embodiment of the present disclosure, the determining, the one or more measurement gaps for the measurement of the one or more SS blocks on the at least one BWP in accordance with the measurement configuration information may include: when the at least one BWP includes one BWP, determining a measurement gap pattern for the measurement of the one or more SS blocks on the BWP in accordance with the measurement configuration information, the measurement gap pattern including at least one local measurement gap of the BWP; or when the at least one BWP includes at least two BWPs, determining measurement gap patterns for the measurement of the one or more SS blocks on the at least two BWPs in accordance with the measurement configuration information, the measurement gap patterns including a measurement gap pattern of each of the at least two BWPs, and the measurement gap pattern of each BWP including at least one local measurement gap of the BWP.

In a possible embodiment of the present disclosure, the local measurement gap may be equal to a sum of a transmission time of T SS blocks and a tuning time at each of two sides of the T SS blocks, where T is an integer greater than or equal to 1, and when T is greater than 1, the T SS blocks are consecutive in a time domain.

In a possible embodiment of the present disclosure, no data service may be provided by the network side device for the UE in the one or more measurement gaps.

It should be appreciated that, in this embodiment, the UE may be a UE for the above-mentioned measurement gap determination method, and the implementation of the UE may refer to that of the above-mentioned measurement gap determination method with a same beneficial effect, which will not be particularly defined herein.

Figure 10:
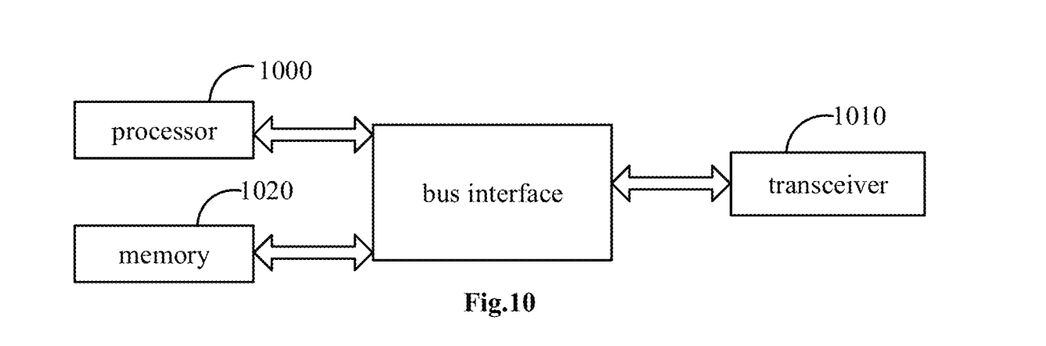
FIG. 10 is a schematic view showing still another network side device according to an embodiment of the present disclosure.

As shown in FIG. 10, the present disclosure further provides in some embodiments another network side device which includes a transceiver 1010, a memory 1020, a processor 1000, and a computer program stored in the memory 1020 and executed by the processor. The processor 1000 is configured to read the computer program stored in the memory 1020, so as to generate measurement configuration information of one or more SS blocks actually transmitted on at least one BWP. The transceiver 1010 is configured to transmit the measurement configuration information to a UE. The UE operates at a BWP on which no SS block is transmitted when the measurement configuration information is transmitted by the network side device to the UE. The transceiver 1010 is configured to receive and transmit data under the control of the processor 1000.

In FIG. 10, bus architecture may include a number of buses and bridges connected to each other, so as to connect various circuits for one or more processors such as the processor 1000 and one or more memories such as the memory 1020. In addition, as is known in the art, the bus architecture may be used to connect any other circuits, such as a circuit for a peripheral device, a circuit for a voltage stabilizer and a power management circuit, which are not particularly defined herein. A bus interface may be provided, and the transceiver 1010 may include a plurality of elements, e.g., a transmitter and a receiver for communication with any other devices over a transmission medium. The processor 1000 may take charge of managing the bus architecture as well general processings. The memory 1020 may store data therein for the operation of the processor 1000.

In a possible embodiment of the present disclosure, the processor 1000 is further configured to read the computer program in the memory 1020, so as to: estimate M SS blocks actually transmitted on the at least one BWP; and select first N SS blocks in the M SS blocks ranked in a descending order of detection probabilities, the detection probabilities being detection probabilities of the UE for the SS blocks, where N is an integer greater than or equal to 1, and M is an integer greater than or equal to N. The measurement configuration information of the one or more SS blocks actually transmitted on the at least one BWP may include measurement configuration information of the N SS blocks.

In a possible embodiment of the present disclosure, the measurement configuration information may include at least one of an index of each of the at least one BWP on which the SS block is actually transmitted, a frequency position of each of the at least one BWP on which the SS block is actually transmitted, and a transmission configuration of each SS block transmitted on each of the at least one BWP. The transmission configuration may include at least one of an index of each actually-transmitted SS block in a SS block set, a time position of each actually-transmitted SS block in the SS block set, a transmission period of the SS block set, a time offset of the SS block set, a carrier spacing of each SS block, and a CP of each SS block. The SS block set may be a SS block set to which each SS block actually transmitted on the at least one BWP belongs.

In a possible embodiment of the present disclosure, the measurement configuration information may further include at least one of an index table of the BWPs to be measured by the UE, a SS block set to be measured by the UE in each BWP in the index table, an RRM measurement period of each BWP in the index table, a start time of the RRM measurement for each BWP in the index table, and a stop time of the RRM measurement for each BWP in the index table, and a measurement report period.

In a possible embodiment of the present disclosure, the processor 1000 is further configured to read the computer program stored in the memory 1020, so as to determine one or more measurement gaps for the measurement of the one or more SS blocks on the at least one BWP by the UE in accordance with the measurement configuration information, or the transceiver 1010 is further configured to determine one or more measurement gaps for the measurement of the one or more SS blocks on the at least one BWP by the UE in accordance with the measurement configuration information. No data service may be provided by the network side device for the UE in the one or more measurement gaps.

In a possible embodiment of the present disclosure, the determining the one or more measurement gaps for the measurement of the one or more SS blocks on the at least one BWP by the UE in accordance with the measurement configuration information may include: when the least one BWP includes one BWP, determining a measurement gap pattern for the measurement of the one or more SS blocks on the BWP by the UE in accordance with the measurement configuration information, the measurement gap pattern including at least one local measurement gap of the BWP; or when the at least one BWP includes at least two BWPs, determining measurement gap patterns for the measurement of the one or more SS blocks on the at least two BWPs by the UE in accordance with the measurement configuration information, the measurement gap patterns including a measurement gap pattern of each of the at least two BWPs, and the measurement gap pattern of each BWP including at least one local measurement gap of the BWP.

In a possible embodiment of the present disclosure, the local measurement gap may be equal to a sum of a transmission time of T SS blocks and a tuning time at each of two sides of the T SS blocks, where T is an integer greater than or equal to 1, and when T is greater than 1, the T SS blocks may be consecutive in a time domain.

It should be appreciated that, in this embodiment, the network side device may be a network side device for the above-mentioned measurement gap determination method, and the implementation of the network side device may refer to that of the above-mentioned measurement gap determination method with a same beneficial effect, which will not be particularly defined herein.

The present disclosure further provides in some embodiments a computer-readable storage medium storing therein a computer program. The computer program is configured to be executed by a processor to implement the above-mentioned measurement gap determination method for the UE.

The present disclosure further provides in some embodiments a computer-readable storage medium storing therein a computer program. The computer program is configured to be executed by a processor to implement the above-mentioned measurement gap determination method for the network side device.

It should be further appreciated that, in the embodiments of the present disclosure, the device and method may be implemented in any other ways. For example, the embodiments for the apparatus are merely for illustrative purposes, and the modules or units are provided merely on the basis of their logic functions. During the actual application, they may be divided in another manner, e.g., some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (e.g., a personal computer, a server or network device) to execute parts of the steps of the method according to the embodiments of the present disclosure. The storage medium includes any medium capable of storing therein program codes, e.g., a Universal Serial Bus (USB) flash disk, a mobile Hard Disk (HD), a Read-Only Memory (ROM), a Random Access Memory (RAM), a magnetic disk or an optical disk.

The above embodiments are preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A measurement gap determination method, comprising:
   receiving, by a User Equipment (UE), measurement configuration information transmitted from a network side device, wherein the measurement configuration information is measurement configuration information of a Synchronization Signal (SS) block actually transmitted on at least one Bandwidth Part (BWP), and the UE operates at the BWP on which no SS block is transmitted when the UE receives the measurement configuration information;
   determining, by the UE, a measurement gap for measurement of the SS block on the at least one BWP in accordance with the measurement configuration information; and
   measuring, by the UE, the SS block on the at least one BWP in the measurement gap,
   wherein the measurement configuration information of the SS block actually transmitted on the at least one BWP comprises:
   measurement configuration information of N SS blocks in M SS blocks actually transmitted on the at least one BWP, wherein the N SS blocks are first N SS blocks in the M SS blocks ranked in a descending order of detection probabilities, the detection probabilities are detection probabilities of the UE for the SS blocks, N is an integer greater than or equal to 1, and M is an integer greater than or equal to N, and the detection probabilities are determined in accordance with beam directions for actually transmitting the SS blocks and a position of the UE.

2. The measurement gap determination method according to claim 1, wherein the measurement configuration information comprises at least one of:
   an index of each of the at least one BWP on which the SS block is actually transmitted, a frequency position of each of the at least one BWP on which the SS block is actually transmitted, or a transmission configuration of the SS block actually transmitted on each of the at least one BWP,
   wherein the transmission configuration comprises at least one of:
   an index of the actually-transmitted SS block in a SS block set, a time position of the actually-transmitted SS block in the SS block set, a transmission period of the SS block set, a time offset of the SS block set, a carrier spacing of the SS block, and a Cyclic Prefix (CP) of the SS block, wherein the SS block set is a SS block set to which each SS block actually transmitted on the at least one BWP belongs.

3. The measurement gap determination method according to claim 2, wherein the measurement configuration information further comprises at least one of:
   an index table of the BWPs to be measured by the UE, a SS block set to be measured by the UE in each BWP in the index table, a period of a Radio Resource Management (RRM) measurement for each BWP in the index table, a start time of the RRM measurement for each BWP in the index table, and a stop time of the RRM measurement for each BWP in the index table, and a measurement report period.

4. The measurement gap determination method according to claim 1, wherein the determining, by the UE, the measurement gap for the measurement of the SS block on the at least one BWP in accordance with the measurement configuration information comprises:
   when the at least one BWP is one BWP, determining, by the UE, a measurement gap pattern for the measurement of the SS block on the BWP in accordance with the measurement configuration information, wherein the measurement gap pattern comprises at least one local measurement gap of the BWP; or
   when the at least one BWP comprises at least two BWPs, determining, by the UE, a measurement gap pattern for the measurement of the SS block on the at least two BWPs in accordance with the measurement configuration information, wherein the measurement gap pattern comprises a measurement gap pattern of each of the at least two BWPs, and the measurement gap pattern of each BWP comprises at least one local measurement gap of the BWP.

5. The measurement gap determination method according to claim 4, wherein the local measurement gap is equal to a sum of a transmission time of T SS blocks and a tuning time at each of two sides of the T SS blocks, wherein T is an integer greater than or equal to 1, and when T is greater than 1, the T SS blocks are consecutive in a time domain.

6. The measurement gap determination method according to claim 1, wherein no data service is provided by the network side device for the UE in the measurement gap.

7. A measurement gap determination method, comprising:
   generating, by a network side device, measurement configuration information of a SS block actually transmitted on at least one BWP;
   transmitting, by the network side device, the measurement configuration information to a UE, wherein the UE operates at the BWP on which no SS block is transmitted when the network side device transmits the measurement configuration information to the UE;
   estimating, by the network side device, M SS blocks actually transmitted on the at least one BWP; and
   selecting, by the network side device, first N SS blocks in the M SS blocks ranked in a descending order of detection probabilities, wherein the detection probabilities are detection probabilities of the UE for the SS blocks, N is an integer greater than or equal to 1, and M is an integer greater than or equal to N, and the detection probabilities are determined in accordance with beam directions for actually transmitting the SS blocks and a position of the UE, wherein the measurement configuration information of the SS block actually transmitted on the at least one BWP comprises measurement configuration information of the N SS blocks.

8. The measurement gap determination method according to claim 7, wherein the measurement configuration information comprises at least one of: an index of each of the at least one BWP on which the SS block is actually transmitted, a frequency position of each of the at least one BWP on which the SS block is actually transmitted, or a transmission configuration of the SS block actually transmitted on each of the at least one BWP, wherein the transmission configuration comprises at least one of:

an index of the actually-transmitted SS block in a SS block set, a time position of the actually-transmitted SS block in the SS block set, a transmission period of the SS block set, a time offset of the SS block set, a carrier spacing of the SS block, and a CP of the SS block, wherein the SS block set is a SS block set to which each SS block actually transmitted on the at least one BWP belongs.

9. The measurement gap determination method according to claim 8, wherein the measurement configuration information further comprises at least one of:

an index table of the BWPs to be measured by the UE, a SS block set to be measured by the UE in each BWP in the index table, a period of a RRM measurement for each BWP in the index table, a start time of the RRM measurement for each BWP in the index table, and a stop time of the RRM measurement for each BWP in the index table, and a measurement report period.

10. The measurement gap determination method according to claim 7, further comprising:

determining, by the network side device, measurement gap for the measurement of the SS block on the at least one BWP by the UE in accordance with the measurement configuration information, wherein no data service is provided by the network side device for the UE in the measurement gap.

11. The measurement gap determination method according to claim 10, wherein the determining, by the network side device, the measurement gap for the measurement of the SS block on the at least one BWP by the UE in accordance with the measurement configuration information comprises:

when the least one BWP is one BWP, determining, by the network side device, a measurement gap pattern for the measurement of the SS block on the BWP by the UE in accordance with the measurement configuration information, wherein the measurement gap pattern comprises at least one local measurement gap of the BWP; or when the at least one BWP comprises at least two BWPs, determining, by the network side device, a measurement gap pattern for the measurement of the SS block on the at least two BWPs by the UE in accordance with the measurement configuration information, wherein the measurement gap pattern comprises a measurement gap pattern of each of the at least two BWPs, and the measurement gap pattern of each BWP comprises at least one local measurement gap of the BWP.

12. The measurement gap determination method according to claim 11, wherein the local measurement gap is equal to a sum of a transmission time of T SS blocks and a tuning time at each of two sides of the T SS blocks, wherein T is an integer greater than or equal to 1, and when T is greater than 1, the T SS blocks are consecutive in a time domain.

13. A UE, comprising:
a transceiver;
a memory;
a processor; and
a computer program stored in the memory and configured to be executed by the processor, wherein the processor is configured to read the computer program in the memory to: receive, via the transceiver, measurement configuration information transmitted from a network side device, wherein the measurement configuration information is measurement configuration information of a SS block actually transmitted on at least one BWP, and the UE operates at the BWP on which no SS block is transmitted when the UE receives the measurement configuration information; determine a measurement gap for measurement of the SS block on the at least one BWP in accordance with the measurement configuration information; and measure the SS block on the at least one BWP in the measurement gap, wherein the measurement configuration information of the SS block actually transmitted on the at least one BWP comprises:

measurement configuration information of N SS blocks in M SS blocks actually transmitted on the at least one BWP, wherein the N SS blocks are first N SS blocks in the M SS blocks ranked in a descending order of detection probabilities, the detection probabilities are detection probabilities of the UE for the SS blocks, N is an integer greater than or equal to 1, and M is an integer greater than or equal to N, and the detection probabilities are determined in accordance with beam directions for actually transmitting the SS blocks and a position of the UE.

14. The UE according to claim 13, wherein the measurement configuration information comprises at least one of:

an index of each of the at least one BWP on which the SS block is actually transmitted, a frequency position of each of the at least one BWP on which the SS block is actually transmitted, or a transmission configuration of the SS block actually transmitted on each of the at least one BWP, wherein the transmission configuration comprises at least one of:

an index of the actually-transmitted SS block in a SS block set, a time position of the actually-transmitted SS block in the SS block set, a transmission period of the SS block set, a time offset of the SS block set, a carrier spacing of the SS block, and a CP of the SS block, wherein the SS block set is a SS block set to which each SS block actually transmitted on the at least one BWP belongs.

15. The UE according to claim 13, wherein the measurement configuration information further comprises at least one of:

an index table of the BWPs to be measured by the UE, a SS block set to be measured by the UE in each BWP in the index table, a period of a RRM measurement for each BWP in the index table, a start time of the RRM measurement for each BWP in the index table, and a stop time of the RRM measurement for each BWP in the index table, and a measurement report period.

16. The UE according to claim 13, wherein the determining the measurement gap for the measurement of the SS block on the at least one BWP in accordance with the measurement configuration information comprises:
> when the at least one BWP is one BWP, determining a measurement gap pattern for the measurement of the SS block on the BWP in accordance with the measurement configuration information, wherein the measurement gap pattern comprises at least one local measurement gap of the BWP; or
>
> when the at least one BWP comprises at least two BWPs, determining a measurement gap pattern for the measurement of the SS block on the at least two BWPs in accordance with the measurement configuration information, wherein the measurement gap pattern comprises a measurement gap pattern of each of the at least two BWPs, and the measurement gap pattern of each BWP comprises at least one local measurement gap of the BWP.

17. A network side device, comprising a transceiver, a memory, a processor, and a computer program stored in the memory and configured to be executed by the processor, wherein
> the processor is configured to read the computer program stored in the memory to implement the measurement gap determination method according to claim 7.

* * * * *